United States Patent [19]
Ozelli et al.

[11] 3,878,134
[45] Apr. 15, 1975

[54] ADHESION ASSISTANTS FOR PRODUCING COMPOSITE BODIES BY VULCANIZATION

[75] Inventors: Riza-Nur Ozelli, Neuss; Gunter Klement, Dusseldorf-Holthausen; Edgar Lieske, Dusseldorf, all of Germany

[73] Assignee: Henkel & Cie GmbH, Dusseldorf-Holthausen, Germany

[22] Filed: June 11, 1973

[21] Appl. No.: 368,504

[30] Foreign Application Priority Data
June 12, 1972 Germany............................ 2228544

[52] U.S. Cl................. 260/4 R; 156/333; 156/330; 156/335; 161/186; 161/190; 161/218; 161/221; 161/242; 161/247
[51] Int. Cl.............................................. C08c 9/14
[58] Field of Search............ 260/4 R, 837, 890, 889, 260/888, 845, 846, 847

[56] References Cited
UNITED STATES PATENTS

| | | | |
|---|---|---|---|
| 2,729,608 | 1/1956 | Strain.................................. | 260/4 R |
| 3,026,294 | 3/1962 | Lieberman..................... | 260/837 R |
| 3,051,666 | 8/1962 | Snoddon........................ | 260/79.3 R |
| 3,081,279 | 3/1963 | Hammel............................. | 260/889 |
| 3,149,086 | 9/1964 | Moore .................................. | 260/847 |
| 3,277,208 | 10/1966 | Nersasian........................ | 260/837 R |
| 3,282,883 | 11/1966 | De Crease................... | 260/94.9 GB |
| 3,629,363 | 12/1971 | Breda.............................. | 260/837 R |

FOREIGN PATENTS OR APPLICATIONS
709,927   7/1968   Belgium

Primary Examiner—Harry Wong, Jr.
Assistant Examiner—Paul R. Michl
Attorney, Agent, or Firm—Hammond & Littell

[57] ABSTRACT

An adhesion assistant or binder composition contains (a) 10 to 30 parts by weight of chlorosulfonated polyethylene, (b) 5 to 25 parts by weight of a di-C-nitroso aromatic compound, especially dinitrosobenzene, (c) 20 to 40 parts by weight of an organic polyisocyanate, (d) 10 to 30 parts by weight of chlorinated rubber, (e) 5 to 20 parts by weight of a phenol resin of the resol type having reactive groups and/or a compound containing more than one epoxide group in the molecule; as well as a process for producing composite bodies by vulcanization utilizes this adhesion assistant.

8 Claims, No Drawings

3,878,134

ADHESION ASSISTANTS FOR PRODUCING COMPOSITE BODIES BY VULCANIZATION

PRIOR ART

Adhesion assistants or binder compositions based on organic polyisocyanates, which may also contain products of addition of triglycidylisocyanurate to organic diisocyanates in the molar ratio 1:3, are known for the production of composite bodies by vulcanizing rubber mixtures on metals or other stable substrates, and are described in copending U.S. Pat. Application Ser. No. 172,580, filed Aug. 17, 1971, now U.S. Pat. No. 3,803,078. It is further known to use chlorosulfonated polyethylene together with organic polyisocyanates as binders for elastomers. These binders may also contain further chlorinated polymers. The use of phenol resins or epoxide resins together with hardeners therefor is also known for glueing or bonding metals to rubber. Such known adhesive mixtures, however, are frequently not sufficient to meet technical requirements in all respects. Thus it is required of a good rubber-metal binder that it can be used as far as possible without a primer; that is only the normal pretreatment of the metal part by mechanical cleaning and degreasing with a solvent is necessary. When binders containing reactive components are used, an undesired alteration of the system often occurs after some time, so that satisfactory adhesive bonds are no longer obtained.

OBJECTS OF THE INVENTION

It is an object of the present invention to provide a process for vulcanizing rubber mixtures on substrates and to provide a rubber-metal binder which is free of the said disadvantages.

It is another object of the present invention to provide a binder with good holding power without the use of a primer, and which has bonds between the rubber and the foundations which are also equal to strong stresses.

It is a further object of the present invention to provide an adhesion assistant or binder composition for use in the production of composite bodies by vulcanizing a vulcanizable rubber mixture on a substrate which is stable under vulcanization conditions consisting essentially of the following binder ingredients dispersible in inert organic solvents a. from 10 to 30 parts by weight of chlorosulfonated polyethylene,
b. from 5 to 25 parts by weight of a di-C-nitroso aromatic compound,
c. from 20 to 40 parts by weight of an organic polyisocyanate,
d. from 10 to 30 parts by weight of chlorinated rubber,
e. from 5 to 20 parts by weight of a component selected from the group consisting of a phenol resin of the resol type having reactive groups, a compound having more than one epoxide group in the molecule and the mixtures thereof,
f. from 0 to 25 parts by weight of a pigment component, and
g. from 0 to 20 parts by weight of additional tack-producing compounds.

It is still another object of the present invention to provide a process for the production of a composite body which consists of applying a layer of the above-described adhesion assistant or binder composition to a substrate which is stable under vulcanization conditions and allowing the same to dry, applying a second layer of a vulcanizable rubber composition to said coated substrate, subjecting the composite to vulcanization conditions, and recovering said composite body.

These and further objects of the present invention will become apparent as the description thereof proceeds.

DESCRIPTION OF THE INVENTION

The present invention relates to the production of composite bodies. More particularly the present invention provides a process for vulcanizing vulcanizable rubber mixtures on metals or substrates, which are stable under the vulcanization conditions, using binder compositions or adhesion assistants based on mixtures of polymers containing chlorine and sulfur, di-C-nitroso compounds and polyisocyanates, as well as the binder compositions or adhesion assistants used for this process.

Therefore the present invention relates to a process for the production of composite bodies by vulcanizing vulcanizable rubber mixtures on metal or other stable substrates after pretreatment with adhesion assistants or binder compositions based on mixtures of polymers containing chlorine and sulfur, di-C-nitroso compounds and polyisocyanates, as well as further usual auxiliary substances, wherein the pretreatment is carried out with substances which contain an addition of phenol resins of the resol type still having reactive groups and/or epoxide compounds with more than one epoxide group in the molecule.

Generally speaking, the present invention is directed to an adhesion assistant or binder composition for use in the production of composite bodies by vulcanizing a vulcanizable rubber mixture on a substrate which is stable under vulcanization conditions consisting essentially of the following binder ingredients dispersible in inert organic solvents a. from 10 to 30 parts by weight of chlorosulfonated polyethylene,
b. from 5 to 25 parts by weight of a di-C-nitroso aromatic compound,
c. from 20 to 40 parts by weight of an organic polyisocyanate,
d. from 10 to 30 parts by weight of chlorinated rubber,
e. from 5 to 20 parts by weight of a component selected from the group consisting of a phenol resin of the resol type having reactive groups, a compound having more than one epoxide group in the molecule and the mixtures thereof,
f. from 0 to 25 parts by weight of a pigment component, and
g. from 0 to 20 parts by weight of additional tack producing compounds.

The present invention is also directed to a process for the production of a composite body which consists of applying a layer of the above-described adhesion assistant or binder composition to a substrate which is stable under vulcanization conditions and allowing the same to dry, applying a second layer of a vulcanizable rubber composition to said coated substrate, subjecting the composite to vulcanization conditions, and recovering said composite body.

The present invention is further directed to an adhesion assistant or binder composition for use in the production of composite bodies by vulcanizing a vulcanizable rubber mixture on a substrate which is stable under vulcanization conditions consisting essentially of form 5 to 50 percent by weight of the above-described binder ingredients, and from 50 to 95 percent by weight of an inert organic solvent liquid at room temperature.

The phenol resins of the resol type which still contain reactive groups and which are soluble in ethanol and toluene are suitable for the preparation of the binders according to the invention. These are condensation products of phenols, particularly phenol, with lower alkanals, particularly formaldehyde which are taken to the resol condensation state. The compounds containing more than one epoxide group in the molecule to be used may be those usually denoted as epoxide resins. They will preferably have an epoxide oxygen content of about from 4% to 12 percent. Commercial products of this type are prepared by reaction, for example, of diphenylolpropane with epichlorhydrin. They are to be regarded as diglycidyl ethers of diphenylolpropane and have a variable molecular weight, which is related to the content of epoxide oxygen.

The adhesion assistants or binders according to the invention should contain as further components chlorosulfonated polyalkylenes, and especially chlorosulfonated polyethylene. A useful chlorosulfonated polyethylene has a chlorine content between about 20 and 50 percent by weight and a sulfur content between about 1 and 2.5 percent by weight.

Moreover, the adhesion assistant or binder according to the invention should still contain active cross-linking compounds such as nitroso compounds. Aromatic poly-C-nitroso compounds are preferred such as aromatic di-C-nitroso compounds for example meta- or para-dinitrosobenzene or meta- or para-dinitrosonaphthalene. In certain cases aromatic C-nitroso compounds which contain 3 or more C-nitroso groups may also be used, especially those having a benzene or naphthalene ring. Instead of the nitroso compounds, for example instead of p-dinitrosobenzene, the components from which they are formed may also be used, as for example p-quinonedioxime and an oxidizing agent, such as a higher valency chromium compound.

The adhesion assistant or binder according to the invention also contains at least one organic polyisocyanate. Preferably the organic polyisocyanate is a higher molecular weight compound having more than 15 carbon atoms, at least two free isocyanate groups, and free of other reactive groups. The following isocyanates are preferably used for the process according to the invention: dianisidine diisocyanate, dimerized o-tolylenediisocyanate, and further the reaction products of an excess of tolylenediisocyanate or of diphenylmethanediisocyanate or of naphthylenediisocyanate with the diglycidyl ether of diphenylolpropane or with the diglycidyl ether of trimethylolpropane, or with N,N-diglycidylaniline, or with cycloaliphatic epoxides such as with vinylcyclohexenedioxide or with bis-(hydroxymethyl-cyclohexenyl) tetrahydrobenzaldehyde acetal.

The adhesion assistant or binder according to the invention also contains from 10 to 30 parts by solids weight of chlorinated rubber. Conventional chlorinated rubbers are employed, particularly chlorinated natural rubber having a chlorine content of from 65 to 68 percent.

The adhesion means according to the invention may contain as further customary auxiliary substances, for example, from 0 to 25 parts by weight of pigments such as metal oxides, for example zinc oxide, silicon dioxide, titanium dioxide, lead oxide, iron oxide, chromium oxide and the different types of carbon black. In the latter case, the kinds usual in the rubber industry are suitably used. In certain cases it may also be advantageous to co-employ from 0 to 20 parts by weight of additional tack producing compounds such as chlorinated aliphatic hydrocarbons or chlorinated aromatic hydrocarbons, condensate resins of the resorcinol-formaldehyde type or coumarone-indene resins or terpene-phenol resins.

For the preparation of the adhesion means or binders the individual components are first dissolved or suspended in an inert organic solvent liquid at room temperature. Preferred solvents are aromatic hydrocarbons such as xylene or toluene or chlorinated hydrocarbons such as trichlorethylene, perchlorethylene, chlorobenzene or ketones for example lower alkanones or cycloalkanones such as methylethylketone, diethylketone, or esters for example lower alkyl lower alkanoates and lower alkyl lower alkanedioates such as ethyl acetate, ethyleneglycol diacetate, butyl acetate, the ethyl ethers of ethyleneglycol monoacetate, and others. The amount of solvent used may vary over a considerable range. In general, however, the amount of solvent used is such that the adhesion assistant or the binder has a solid content of 5 to about 50 percent by weight, especially 20 to 30 percent by weight.

The binder is applied by spreading, dipping or spraying on the corresponding pretreated substrate. Before applying the binder mechanical impurities from sandblasting, or chill casting grit, are suitably previously removed. Further, it is generally necessary to carry out a degreasing by solvents. Trichloroethylene vapor can advantageously be used for the degreasing. If the rubber mixture is to be vulcanized on a non-metal substrate, for example, a substrate saturated with synthetic resin such as phenol resin or melamine resin, or another plastics material, a roughening or a removal of fats or other impurities by treatment with suitable organic solvents is suitably effected. After the application of the binder or adhesion means, the solvent used can be evaporated. The metals or substrates thus coated are able to be stored for several days without losing their ability to enter into adhesive rubber-metal bonds.

The actual bond between the rubber and the substrate is effected at the temperatures needed for the vulcanizable rubber mixture used at a slightly increased pressure. In general the temperature used is between 120° and 220°C and the time required for the vulcanizing is from 5 minutes to 1 hour.

The process according to the invention can advantageously be employed using the adhesion assistants and binders described in the invention for vulcanizing vulcanizable rubber mixtures based on styrene-butadiene rubber, nitrile rubber, polychloroprene, natural rubber and butyl rubber on metal substrates. Moreover, it can also be used with so-called stable substrates, i.e. those which are stable under vulcanization conditions.

The bonds obtained are marked by a high adhesive strength and high stability against corrosive media and against commercial oils and fats. The composite bodies produced by means of the process of the invention may be used in a large variety of technical fields, especially in the automobile industry as flexible bearings, clutches, shock absorbers and sealing parts, in the manufacture of apparatus for the construction of chemical plants or in the building sector.

The following examples are merely illustrative of the present invention without being deemed limitative in any manner thereof.

EXAMPLES

In the following examples the vulcanizable rubber mixtures donated by A, B, C, D and E were vulcanized on substrates. The compositions of the mixtures and the vulcanization conditions are indicated below. All parts are by weight unless otherwise indicated.

MIXTURE A

| | | |
|---|---|---|
| 100 | parts of | natural rubber (smoked sheets) |
| 10 | parts of | zinc oxide |
| 2 | parts of | stearic acid |
| 1 | parts of | phenyl-β-naphthylamine |
| 2 | parts of | pine tar |
| 25 | parts of | EPC carbon black |
| 0.33 | parts of | zinc dimethyldithiocarbamate |
| 0.58 | parts of | dibenzothiazyldisulfide |
| 2.75 | parts of | sulfur |

Vulcanization conditions: 10 minutes at 153°C.

MIXTURE B

| | | |
|---|---|---|
| 100 | parts of | styrene-butadiene rubber |
| 5 | parts of | zinc oxide |
| 1 | parts of | stearic acid |
| 50 | parts of | HAF carbon black |
| 8 | parts of | saturated polymeric peanut oil hydrocarbons |
| 1.25 | parts of | N-cyclohexyl-2-benzthiazylsulfenamide |
| 1.75 | parts of | sulfur |

Vulcanization conditions: 30 minutes at 153°C.

MIXTURE C

| | | |
|---|---|---|
| 100 | parts of | polychloroprene rubber |
| 4 | parts of | magnesium oxide |
| 5 | parts of | zinc oxide |
| 2 | parts of | phenyl-β-naphthylamine |
| 80 | parts of | MT carbon black (Sterling) |
| 1 | parts of | mixture of high-boiling hydrocarbons (b.p. over 300°C) |
| 5 | parts of | naphthenic oil |
| 0.5 | parts of | tetramethylthiuram-monosulfide |
| 0.5 | parts of | di-o-tolylguanidine |
| 0.5 | parts of | ethylenethiourea |
| 1 | parts of | sulfur |

Vulcanization conditions: 30 minutes at 153°C.

MIXTURE D

| | | |
|---|---|---|
| 100 | parts of | nitrile rubber (42% acrylonitrile content) |
| 5 | parts of | zinc oxide |
| 1 | parts of | stearic acid |
| 65 | parts of | SRF carbon black |
| 10 | parts of | terpene resin |
| 10 | parts of | dibutyl phthalate |
| 0.31 | parts of | tetramethylthiuram-monosulfide |
| 1 | parts of | sulfur |

Vulcanization conditions: 25 minutes at 153°C.

MIXTURE E

| | | |
|---|---|---|
| 100 | parts of | butyl rubber |
| 5 | parts of | zinc oxide |
| 1 | parts of | stearic acid |
| 50 | parts of | HAF carbon black |
| 1 | parts of | dibenzothiazyldisulfide |
| 1.5 | parts of | tellurium diethyldithiocarbamate |
| 1 | parts of | sulfur |

Vulcanization conditions: 30 minutes at 160°C

Isocyanate components
 a. dianisidine diisocyanate,
 b. dimerized tolylene diisocyanate,
 c. reaction product from the diglycidyl ether of bis-phenylolpropane with diphenylmethane diisocyanate in the molar ratio 1:2,
 d. reaction product from the diglycidyl ether of diphenylolpropane with tolylenediisocyanate in the molar ratio 1:2, 1
 e. reaction product of epoxidized bis-(hydroxymethyl-cyclohexenyl)-tetrahydrobenzaldehyde-acetal with tolylene diisocyanate in a molar ratio such that one molecule of tolylene diisocyanate is present per epoxide oxygen group,
 f. reaction product from the diglycidyl ether of diphenylolpropane with naphthylene diisocyanate-(1,5) in the molar ratio 1:2,
 g. reaction product from N,N-diglycidylaniline with tolylenediisocyanate in the molar ratio 1:2,
 h. reaction product from N,N-diglycidylaniline with diphenylmethane diisocyanate in the molar ratio 1:2,
 i. reaction product from vinylcyclohexenedioxide with diphenylmethane diisocyanate in the molar ratio 1:2.

EXAMPLE 1

Adhesion binders were prepared by dispersing the following components in a mixture of 7.36 kg of xylene and 0.400 kg of trichloroethylene:

400 g chlorosulfonated polyethylene, having a chlorine content of 34.5 percent and a sulfur content of 0.9 percent
  500 g chlorinated rubber having a chlorine content of 65 to 68 percent p1 100 g p-dinitrosobenzene
  560 g isocyanate component according to a,b,c,d and e above
  400 g phenol-formaldehyde resol resin, dilutable with water, viscosity measured in 80 percent ethanol solution at 20°C was about 4500 cP
  280 g inert carbon black
  140 g zinc oxide.

Metal sheet samples of cold-rolled steel were degreased with trichloroethylene vapor, blasted with chill casting grit and treated again with trichloroethylene vapor. Then the adhesion binder was applied to the sheets by dipping. After drying, the sheets were bonded to the rubber mixtures A, B, C, D and E according to ASTM/D 429 Method B within the conditions of a vulcanization in the press under a pressure of 60 kp/cm². The amount of rubber used was sufficient to give a layer of approximately 5 mm thickness. After storing the test body for 24 hours at room temperature, the rubber coating was peeled off at an angle of 45°. The peeling resistance and the tearing behavior were determined according to the normal method. In the tearing behavior 100 R indicates that 100 percent tearing was observed in the rubber; at 50 RC, 50 percent tearing was found in the rubber and 50 percent in the layer of binder. The number before M gives the percentage rate of exposure of the metal together with the binder after tearing.

In Table I, proceeding from left to right, the rubber mixture used is given in the first column followed by the adhesion binder means used and then the peeling resistance in kg/inch. Then the tearing behavior of the sample not exposed to the hot water follows. In the last column the tearing behavior is given which was found after 2 hours storage with application of load in water at 95°C (K.W.T.).

TABLE I

| Rubber Mixture | Adhesion Assistant | ASTM-D 429, B Peeling Resistance kg/in. | Tearing Behavior | Tearing Behavior K.W.T. |
|---|---|---|---|---|
| A | a) | 38 | 100 R | 95 R - 5M |
|   | b) | 20 | 100 R | 100 R |
|   | c) | 33 | 100 R | 100 R |
|   | d) | 25 | 100 R | 100 R |
|   | e) | 22 | 100 R | 100 R |
| B | a) | 65 | 100 R | 100 R |
|   | b) | 74 | 100 R | 100 R |
|   | c) | 71 | 100 R | 100 R |
|   | d) | 67 | 100 R | 100 R |
|   | e) | 71 | 100 R | 100 R |
| C | a) | 49 | 100 R | 95 R - 5M |
|   | b) | 37 | 100 R | 100 R |
|   | c) | 43 | 100 R | 100 R |
|   | d) | 43 | 100 R | 97 R - 5M |
|   | e) | 47 | 100 R | 100 R |
| D | a) | 48 | 100 R | 100 R |
|   | b) | 55 | 100 R | 95 R - 5M |
|   | c) | 47 | 100 R | 100 R |
|   | d) | 54 | 100 R | 100 R |
|   | e) | 54 | 100 R | 100 R |
| E | a) | 47 | 100 R | 100 R |
|   | b) | 50 | 100 R | 95 R - 5M |
|   | c) | 43 | 100 R | 100 R |
|   | d) | 44 | 100 R | 97 R - 5M |
|   | e) | 43 | 100 R | 100 R |

EXAMPLE 2

Utilizing a procedure analogous to that described in Example 1, the rubber mixtures were bonded to cold-rolled steel with the binder which contained dianisidine-diisocyanate (isocyanate component(a) above).

The test bodies were stored at room temperature for 7 days in brake fluid liquids customarily used in cars (ATE brake fluid liquid) and a lubricating oil, which consisted of a mixture of hydrocarbons. Further samples were stored in the same oil for 7 days at 200°C.

Then all the samples were torn and the tearing behavior was determined. With these conditions of storage practically no alteration of the bond had occurred over that of Example 1.

EXAMPLE 3

The binder mixtures prepared according to Example 1 which contained dianisidine diisocyanate (a), the reaction product of the diglycidyl ether of diphenylolpropane with tolylene diisocyanate (d), and the diglycidyl ether of diphenylolpropane with diphenylmethane diisocyanate (c) were used to bind the rubber mixture B (styrene-butadiene rubber) to metal sheet samples consisting of cold-rolled steel at a temperature of 200°C for 3 minutes. The peeling tests gave in all cases a complete break in elastomers, i.e. the tearing behavior showed 100 R.

EXAMPLE 4

400 g of clorosulfonated polyethylene, 500 g of chlorinated rubber, 100 g of p-dinitrosobenzene, 560 g of dianisidine diisocyanate, 400 g of the diglycidyl ether of diphenylolpropane (epoxide oxygen content 8.7%), 280 g of carbon black, and 140 g of zinc oxide were suspended in a mixture of 7.360 kg of xylene and 0.400 kg of trichloroethylene. The chlorosulfonate polyethylene and chlorinated rubber were the same as in Example 1.

Degreased and sand-blasted sample sheets according to Example 1 were bonded with rubber mixtures A, B and E. After a storage of 24 hours the peeling test according to ASTM/D 429B was carried out on the test bodies.

In all cases a complete fracture in the elastomers was shown, i.e. the tearing behavior was 100 R. In addition, after a 2 hour holding in hot water at 95°C, the tearing behavior did not change.

EXAMPLE 5

Binders were prepared by dispersing the following components in a mixture of 7.2 kg of xylene and 0.4 kg of trichloroethylene:

400 g chlorosulfonated polyethylene as in Example 1
   500 g chlorinated rubber as in Example 1
   140 g zinc oxide
   300 g p-dinitrosobenzene
   100 g inert carbon black
   560 g isocyanate component according to f, g, i, and h above
   400 g phenol-formaldehyde resol resin, dilutable with water, viscosity measured in 80 percent ethanol solution at 20°C was about 5000 cP Using this adhesion binder means, various rubber mixtures were vulcanized on steel sheets and the bonds were examined according to Example 1.

The results are compiled in Table II below:

TABLE II

| Rubber Mixture | Adhesion Assistant | Peeling Resistance kg/in. | Tearing Behavior | Tearing Behavior K.W.T. |
|---|---|---|---|---|
| A | f) | 24 | 100 R | 100 R |
|   | g) | 27 | 95R-5RC | 100 R |
|   | i) | 21 | 100 R | 100 R |
|   | h) | 26 | 100 R | 100 R |

TABLE II – Continued

| Rubber Mixture | Adhesion Assistant | Peeling Resistance kg/in. | Tearing Behavior | Tearing Behavior K.W.T. |
|---|---|---|---|---|
| B | f) | 70 | 100 R | 100 R |
|   | g) | 73 | 100 R | 100 R |
|   | i) | 72 | 100 R | 100 R |
|   | h) | 81 | 100 R | 90 R - 10M |
| C | f) | 59 | 100 R | 100 R |
|   | g) | 45 | 100 R | 98 R - 2M |
|   | i) | 47 | 100 R | 100 R |
|   | h) | 50 | 100 R | 60 R - 40M |
| E | f) | 49 | 100 R | 100 R |
|   | g) | 49 | 100 R | 100 R |
|   | i) | 46 | 100 R | 100 R |
|   | h) | 46 | 100 R | 100 R |

EXAMPLE 6

The following substances were dissolved in a mixture of 7000 g of xylene and 400 g of trichloroethylene:

400 g chlorosulfonated polyethylene as in Example 1
500 g chlorinated rubber as in Example 1
300 g p-dinitrosobenzene
280 g inert carbon black
140 g zinc oxide
560 g polyisocyanate component according to f, g, and i
400 g commercial diglycidyl ether of diphenylolpropane (epoxide oxygen content 9.2%)

The rubber mixtures A and B were vulcanized according to Example 1 on test steel sheets and examined according to ASTM/D 429 B. The results are compiled in Table III below:

TABLE III

| Rubber Mixture | Adhesion Assistant | Peeling Resistance kp/in. | Tearing Behavior | Tearing Behavior K.W.T. |
|---|---|---|---|---|
| A | f) | 29 | 100 R | 80 R - 20M |
|   | g) | 32 | 100 R | 97 R - 3M |
|   | i) | 33 | 100 R | 90 R - 10M |
| B | f) | 74 | 100 R | 100 R |
|   | g) | 78 | 100 R | 90 R - 10M |
|   | i) | 73 | 100 R | 60 R - 40M |

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. An adhesion assistant or binder composition for use in the production of composite bodies by vulcanizing a vulcanizable rubber mixture on a substrate which is stable under vulcanization conditions consisting essentially of from 5% to 50% by weight of the following binder ingredients dispersible in inert organic solvents
   a. from 10 to 30 parts by weight of chlorosulfonated polyethylene,
   b. from 5 go 25 parts by weight of a di-C-nitroso aromatic compound,
   c. from 20 to 40 parts by weight of an organic polyisocyanate,
   d. from 10 to 30 parts by weight of chlorinated natural rubber,
   e. from 5 to 20 parts by weight of a component selected from the group consisting of (1) a phenol resin of the resol type having reactive groups, (2) a compound having more than one epoxide group in the molecule consisting of diglycidyl ethers of diphenylolpropane having an epoxide oxygen content of 4 to 12 percent by weight, and (3) the mixtures thereof,
   f. from 0 to 25 parts by weight of a pigment component, and
   g. from 0 to 20 parts by weight of additional tack producing compounds and from 50 to 95 percent by weight of an inert organic solvent liquid at room temperature.

2. The adhesion assistant or binder composition of claim 1, in which said organic polyisocyanate is an organic diisocyanate.

3. The adhesion assistant or binder composition of claim 2, in which said organic diisocyanate is selected from the group consisting of dianisidine diisocyanate, dimerized o-tolylene diisocyanate, and the reaction product of an excess of a first reactant selected from the group consisting of tolylene diisocyanate, diphenylmethane diisocyanate, and naphthylene diisocyanate with a second reactant selected from the group consisting of the diglycidyl ether of diphenylolpropane, the diglycidyl ether of trimethylolpropane, N,N-diglycidylaniline, vinylcyclohexenedioxide and bis-(hydroxymethyl-cyclohexenyl) tetrahydrobenzaldehyde-acetal.

4. The adhesion assistant or binder composition of claim 1, in which said organic polyisocyanate is selected from the group consisting of dianisidine diisocyanate, dimerized tolylene diisocyanate, the reaction product from the diglycidyl ether of bisphenylolpropane with diphenylmethane diisocyanate in the molar ratio of 1:2, the reaction product from the diglycidyl ether of diphenylolpropane with tolylene diisocyanate in the molar ratio of 1:2, the reaction product of epoxidized bis-(hydroxymethyl-cyclohexenyl)-tetrahydrobenzaldehyde-acetal with tolylene diisocyanate in a molar ratio such that one tolylene diisocyanate is present per epoxide oxygen group, the reaction product from the diglycidyl ether of diphenylolpropane with naphthylene diisocyanate-(1,5) in the molar ratio of 1:2, the reaction product from N,N-diglycidyl aniline with tolylene diisocyanate in the molar ratio of 1:2, the reaction product from N,N-diglycidyl aniline with diphenylmethane diisocyanate in the molar ratio 1:2, and the reaction product from vinylcyclohexenedioxide with diphenylmethane diisocyanate in the molar ratio of 1:2.

5. The adhesion assistant or binder composition of claim 1, in which said component (e) is said compound having more than one epoxide group in the molecule consisting of diglycidyl ethers of diphenylolpropane having an epoxide oxygen content of 4 to 12 percent by weight.

6. The adhesion assistant or binder composition of claim 1, in which said phenol resin of the resol type is a phenol formaldehyde condensate of the resol type still containing reactive groups and soluble in ethanol and toluene.

7. The adhesion assistant or binder composition of claim 1, in which said pigment component is selected from the group consisting of metal oxides, carbon black, and the mixtures thereof.

8. The adhesion assistant or binder composition of claim 1, in which said chlorinated natural rubber has a chlorine content of 65 to 68 percent.

* * * * *